C. EGGELSTON.
Grain-Drill.

No. {10, 31,014.}  Patented Jan. 1, 1861.

Witnesses.
E. P. King
W. C. Leonard

Inventor.
C. Eggelston.

UNITED STATES PATENT OFFICE.

C. EGGELSTON, OF BELOIT, WISCONSIN.

IMPROVEMENT IN SEEDING-MACHINES.

Specification forming part of Letters Patent No. 31,014, dated January 1, 1861.

*To all whom it may concern:*

Be it known that I, C. EGGELSTON, of Beloit, in the State of Wisconsin, have invented a new and useful Improvement in Seeding-Machines; and I do hereby declare that the following is a full and exact description thereof, reference being had to the accompanying drawings, and to the letters of reference marked thereon.

The nature of my invention consists in certain improvements in seeding-machines, as will be hereinafter fully described.

Figure 1:
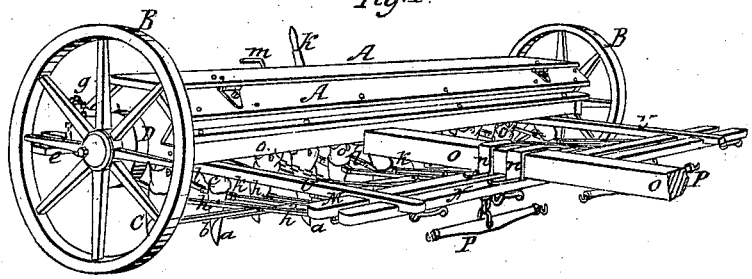
Figure 4:
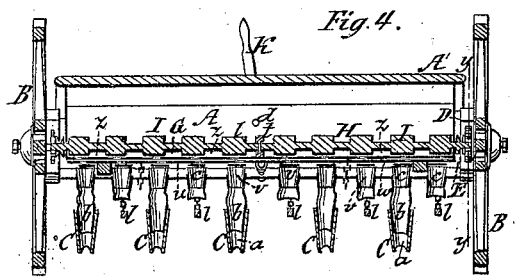
Figure 3:
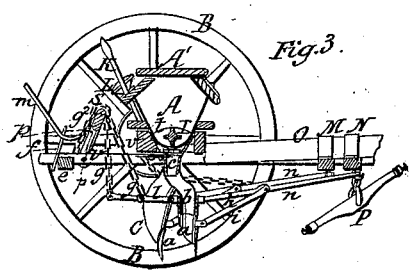
Figure 2:
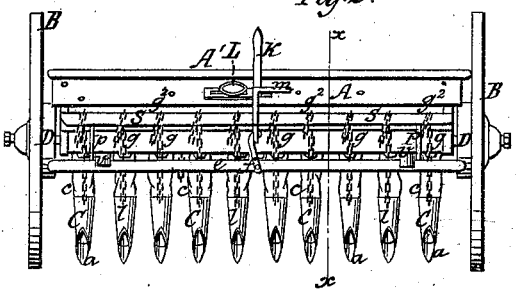
Figure 5:
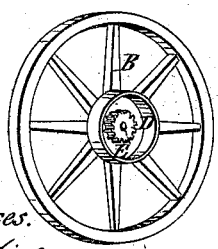
Figure 6:
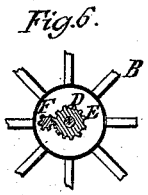
Figure 7:
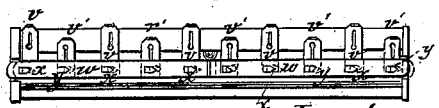

In the accompanying drawings, forming part of this specification, Figure 1 represents a perspective view of one of my improved feeding-machines. Fig. 2 is a rear elevation of the same. Fig. 3 is a vertical cross-section at the line $x\,x$ of Fig. 2. Fig. 4 is a vertical lateral section. Fig. 5 is an isometrical view of one of the driving and carrying wheels detached from the machine. Fig. 6 is a vertical section at $y\,y$, Fig. 4; and Fig. 7 is a partial bottom view, illustrating operation of cut-offs, &c., as will be presently explained.

In the several views of the drawings the same letters indicate the same parts of the apparatus.

A is the hopper or seed-chest, which is supported and carried by the two wheels B B. Said wheels are hung on suitable axles, and serve also to rotate the seed-shafts G and H in box A, as will be presently described.

C are the seed-drill spouts.

D are annular cases on inner sides of wheels B, and which inclose the driving-gears E and pinions F.

The frame of the machine consists of two side bars or beams, U and V, two front bars, M and N, and a rear bar, $e$. On upper surface of bars M N are fastened two staples, $n\,n$, through which the tongue O, to which the team is harnessed, passes, as clearly shown at Fig. 1.

P P are the single-trees, and A' is the lid or cover of hopper through, which the seed to be sown is introduced to the hopper.

The shafts G and H are arranged in one and the same straight line, their outer ends having their bearings in the ends of hopper A, and having secured on them pinions F F, and their inner or adjacent ends being supported in a partition-stand, $t$, as seen at Fig. 4. In the bottom Z of the hopper A are formed a number of holes or exits, which are square at one end and diamond-shaped at the other end, and immediately beneath the bottom Z of the hopper is arranged a false or sliding bottom piece or plate, W, which has also a corresponding series of holes or exits similarly shaped, but with their diamond-shaped ends adjacent to the square ends of the holes in bottom Z. This relative arrangement of the pieces Z and W and their exits is clearly illustrated at Figs. 3, 4, and 7. In the latter view the full black lines represent the slots or exits in sliding bottom plate, W, and the dotted black lines show the exits in bottom Z. The red lines show the varied position of the sliding plate W. The sliding plate W is moved longitudinally by means of a hand-lever, K, having its fulcrum at $d$, and connected by a pivot-joint at its lower end to the center of said plate W. The extent of motion of this lever K, which regulates the slide $w$, is governed by an adjustable stop, L, on the upper side of box A.

Immediately beneath each opening or exit of the hopper is arranged a cut-off plate, $v\,v$, which are operated (each one separately) by hand. These cut-offs are clearly shown at Figs. 2, 3, 4, and 7. In the latter figure they are shown in their different positions, those marked $v$ being open, those $v'$ closed. The agitators and feeders I are arranged immediately over the exits in hopper-bottom, which in a cross-section is semi-cylindrical, as shown at Fig. 3, for purposes to be explained. The seed-spouts are formed of an upper metallic portion, $c$, secured to the bottom of hopper, then a flexible portion, $b$, extending down into a metallic portion, $a$, which latter is suitably made to constitute the drill for forming the furrows in the ground.

Each one of the spouts $c$ is secured along its front side to a bifurcated brace-rod, $h\,i$, and at its rear side to one end of a chain, $g$. The forward ends of rods $h$ are pivoted alternately to the bars M and N, (see Figs. 1 and 3,) and the chains $g$ are hooked onto pins $g^2$ in the bar S. This bar is hung on the upper ends of two arms, $p$, which are hinged to bars V and V in such manner as to admit of the bar S vibrating in the arc of a circle.

$m$ is a hand-lever, by which bar S is moved, and $f$ is a retaining catch-bar to hold the beam S in a fixed position when desirable. The spouts C are caused, by the rods $h$ being pivoted alternately to the beams M and N, to stand alternately forward and back—that is, in two parallel lines—as shown at Figs. 1 and 3.

The general operation of the machine may be thus briefly explained: The hopper A being supplied with seed or grain of any kind, and the team hitched up, and the several parts adjusted to suit the kind of seed to be sown and the manner in which it is to be deposited, (these manipulations will be particularly described directly,) the machine is drawn along, the drills $a$ forming the furrows and the seed passing down through the spouts C, fed by the rotating shafts G and H, with their feeders I, and which are driven by the main wheels B B, as before recited.

It will be seen that by constructing the driving-wheel B with projecting annular cases D, as shown, and arranging the gearing with said case, the gearing is effectually protected from the dirt thrown up by the wheels, and thus enabled to run much longer without wearing out or becoming inoperative.

By making the bottom of the hopper A semi-cylindrical in cross-section, as shown and described, the seed is allowed to be fed much more freely and evenly to the exits than when the box or hopper has square edges or corners at its bottom. The slots in the bottom piece, Z, and slide $w$ are made pointed at one end, as already described, in order that the exit formed may be diamond-shaped, and so that as said opening's capacity is diminished the hole may always retain the same shape, and be always immediately below the center of feeders I. By pushing in the cut-offs $r\ r$ the seed may be cut off from any of the spouts, so as to make the machine sow every other drill, or one-half the width of the machine. The spouts C are all readily detachable to render the machine capable of suitable attachments to sow broadcast. By hooking the chains $g$ onto the pins $g^2$ at different points the seed and drill spouts C will be hung at different heights relatively to the wheels B, so as to drill different depths of furrow to suit the kind of seed to be sown, the flexible portions $b$ admitting the portions $a$ and $c$ to move toward or from each other, and keep the connection always perfect. The stop L may be adjusted by a scale marked on the box, if deemed expedient, to set the capacity of the exit for different kinds of seed. By simply depressing the hand-lever $m$ all the drill-spouts will be elevated, so as to run free of the ground for running the machine from place to place without seeding, and while so doing the exits may be all cut off (the parts having any of the relative adjustments of which they are capable) by means of lever K moving slide $w$.

It will be observed that the arrangement of the frame-work is very simple and durable, and at the same time affords facilities for the peculiar arrangement of the other parts, as shown and described.

By making the rotary seed-shafts in hopper in two parts, G and H, driven from the two wheels B B, and having bearings in a central partition or stand, $t$, great advantage arises, since it is not so difficult and costly to make and adjust these two portions running independently of each other as it is to make and set one long shaft so that it will run true and not cut its bearings, while also there is not half the liability of twisting out of line by obstacles in the box, as there is with one long shaft.

Having fully described the construction and operation of my machine, what I claim therein as new, and desire to secure by Letters Patent, is—

1. The combination, with the spoked driving-wheel B and concentric spur-gear E, of a surrounding case, D, and seed-shaft pinion F, the whole arranged and operating as specified, for the purpose set forth.

2. In combination with the series of spouts C, the series of cut-offs $v\ v'$ and the adjustable diamond-slotted bottom Z and slide $w$, with its hand-lever K and adjustable stop L, the whole constructed and operating as described, for the purpose set forth.

3. In combination with the semi-cylindrical seed-box bottom, the double seed-shaft G H, with two sets of gears and central bearing-partition, $t$, and separate cut-offs to each seed-spout, the whole constructed and operating as specified, for the purposes set forth.

4. In combination with the spouts C, attached by removable rods $h\ i$ and set in and out, as specified, the chains $g$, supporting adjustable beam S, and the main frame with two beams, M and N, one in advance of the other, the whole constructed and operating as described, for the purposes set forth.

In testimony whereof I have hereunto set my hand.

C. EGGELSTON.

Witnesses:
E. P. KING,
W. A. LEONARD.